United States Patent [19]

Abbott et al.

[11] Patent Number: 4,713,877
[45] Date of Patent: Dec. 22, 1987

[54] METHOD OF FORMING PERMANENT MAGNETS WITHIN A MOTOR YOKE

[75] Inventors: Edward H. Abbott, Ann Arbor; Robert H. Erickson, West Bloomfield; William F. Horn, Plymouth, all of Mich.

[73] Assignee: Ford Motor Company, Dearborn, Mich.

[21] Appl. No.: 826,435

[22] Filed: Feb. 5, 1986

[51] Int. Cl.⁴ .................... H01F 41/00; H01F 1/36; H02K 15/00
[52] U.S. Cl. .................................... 29/596; 29/608; 252/62.63; 264/DIG. 58
[58] Field of Search ............... 29/596, 608; 252/62.63; 264/DIG. 58

[56] References Cited

U.S. PATENT DOCUMENTS

| | | |
|---|---|---|
| 2,048,161 | 7/1936 | Klaiber . |
| 2,513,227 | 6/1950 | Wylie . |
| 2,854,412 | 9/1958 | Brockman et al. . |
| 3,083,310 | 3/1963 | Tweedy et al. . |
| 3,766,642 | 10/1973 | Schlaudt et al. . |
| 3,830,743 | 8/1974 | Schlaudt et al. . |
| 3,884,823 | 5/1975 | Clendenen et al. . |
| 3,956,440 | 5/1976 | Deschamps et al. ... 264/DIG. 58 X |
| 4,062,922 | 12/1977 | Olson et al. . |
| 4,104,787 | 8/1978 | Jandeska et al. ................. 29/608 X |
| 4,533,407 | 8/1985 | Das et al. .......................... 29/608 X |

OTHER PUBLICATIONS

"Hot Isostatic Processing", by Hanes et al., Nov. 1977, Battelle Columbus Laboratories-MCIC Report, 77-34.

*Primary Examiner*—Howard N. Goldberg
*Assistant Examiner*—Taylor J. Ross
*Attorney, Agent, or Firm*—Paul K. Godwin, Jr.; Clifford L. Sadler

[57] ABSTRACT

A method of forming a 360° ceramic permanent magnet by utilizing a hot isostatic pressing technique on a ceramic preform paterial cylindrically formed and placed inside a deformable metal housing having an inner diameter that is approximately the same but only slightly larger than the outer diameter of the preform. A solid steel mandrel is provided in the center diameter of the hollow cylindrical preform. Crystal alignment and densification of the ceramic material is achieved by using the hot isostatic pressing technique applied to the outside of the housing, preform and mandrel assembly.

8 Claims, 5 Drawing Figures

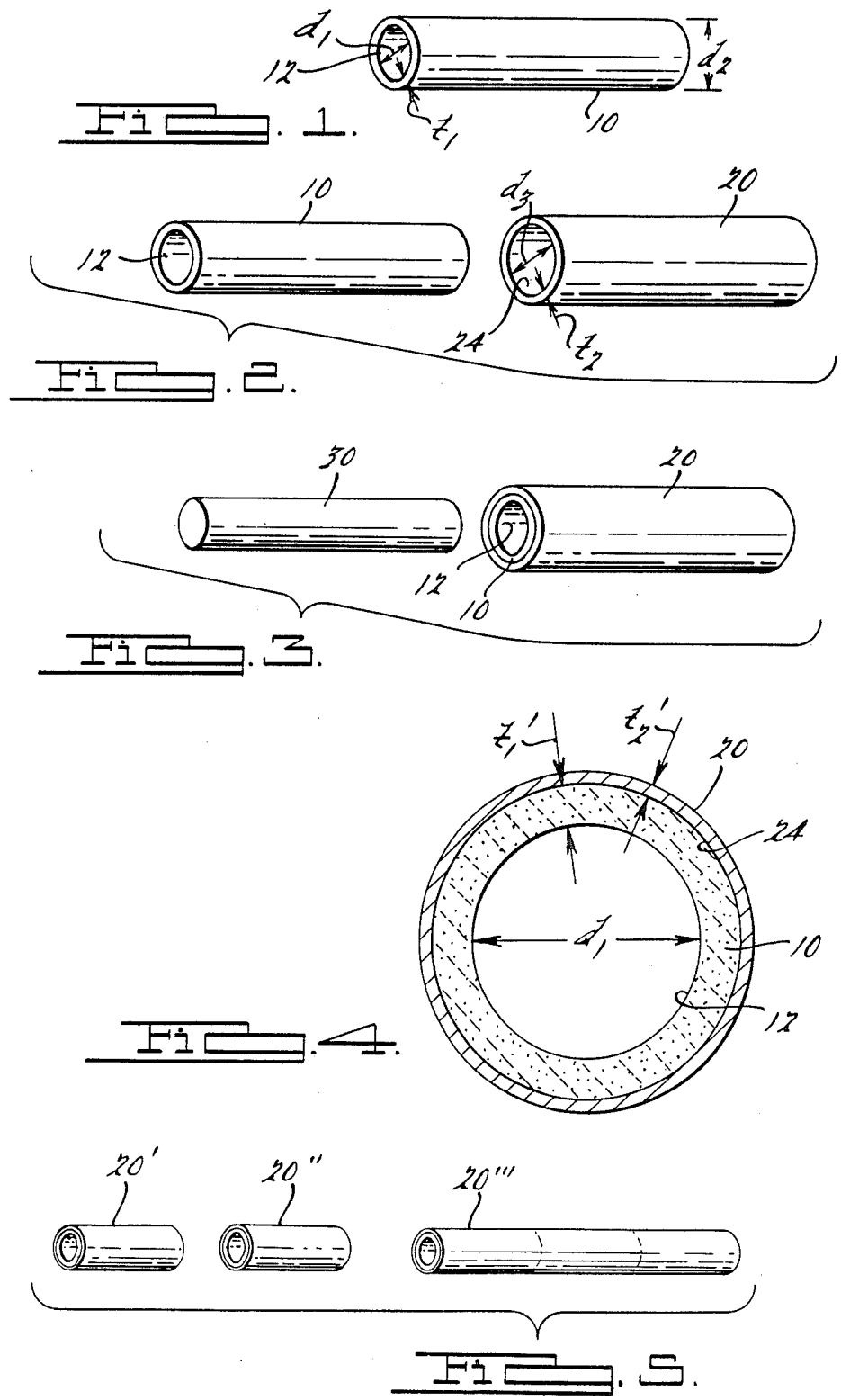

METHOD OF FORMING PERMANENT MAGNETS WITHIN A MOTOR YOKE

BACKGROUND OF THE INVENTION

1. Field of the Invention

The present invention relates to the field of motor assemblies and more specifically to the area of improved methods of forming permanent magnets and assembling permanent magnets within a motor yoke.

2. Description of the Prior Art

Several patents discuss techniques employed to form ceramic permanent magnets from selected powder materials. For instance, U.S. Pat. Nos. 3,766,642; 3,830,743; 3,884,823; and 4,062,922, incorporated herein by reference, teach processes and formulations for preparing ferrite permanent magnets especially suited for use in small motor applications, due to the high coercive force and high remanence of such magnets.

The use of magnets, such as those described above, as well as other ceramic magnet materials in motor applications has involved the separate ceramic formation of the magnets as individual arc shaped elements that are subsequently installed within the conductive motor housing (yoke). U.S. Pat. Nos. 2,048,161; 2,513,227; and 3,083,310 illustrate typical methods of using wedges, clips and bolts to retain arc shaped magnets within the motor yoke. Recent improvements in adhesives have provided an alternative method for attaching magnets in place within the yoke.

SUMMARY OF THE INVENTION

In each of the above-mentioned prior art motor assembly techniques, there is considerable expense incurred due to hand labor or special tooling that could be saved by a more direct approach. The present invention provides an improved technique in which 360° ring ceramic permanent magnets are formed in-situ and compressibly retained as an integral part of the yoke.

In the described invention, it is an object to provide an improved method of forming 360° ring type magnets ideally suited for use in electric motors.

It is another object of the present invention to provide an assembly technique for motor magnets that is highly suitable for a flexible automated manufacturing environment in which such assembly technique may be commonly employed for assembling motors of varying sizes and ratings.

BRIEF DESCRIPTION OF THE DRAWINGS

FIG. 1 represents a hollow extrusion of a ceramic preform material.

FIG. 2 represents the insertion of the preform shown in FIG. 1, into a steel container.

FIG. 3 represents the insertion of a mandrel into the hollow center of the preform shown in FIG. 2 prior to the densification process.

FIG. 4 is a cross-sectional view of the in-situ formed ceramic magnet material within the steel container following the densification process.

FIG. 5 represents the cutting of the in-situ formed ceramic permanent magnets and steel container into desired lengths suitable for use as motor yoke/magnet assemblies.

DETAILED DESCRIPTION OF THE PREFERRED EMBODIMENT

In work performed to develop a homogenious high density ceramic magnet with enhanced magnetic properties for use in permanent magnet motors, it was found that the use of a hot isostatic pressing (HIP) process causes a densification and crystal orientation that is highly desirable. In particular, the hexagonal platelets of strontium, barium or lead hexaferrite powders of less than 2 micron grain size can be precisely oriented for maximum densification by the application of heat and high gas pressure to form predetermined shapes for magnets having magnetic properties that are equal to or exceed magnets made by other methods.

The formation of a 360° cylindrical permanent magnet within a cylindrical metal housing by the method described below offers an advance in motor assembly that is highly suited for automated processes, wherein the same assembly techniques can be used on a programmed system in which motors of various sizes and ratings are assembled.

In FIG. 1, a length of ceramic preform 10 is shown as being formed in the shape of a hollow cylinder having a predetermined inner diameter dimension $d_1$, an outer diameter $d_2$ and a particular wall thickness $t_1$. The preform is usually prepared using selected low micron sized hexaferrite powders in predetermined proportions according to the desired chemical and physical properties for a particular ceramic magnet material. Such methods as cold pressing, extrusion, or slip casting can be used to make the preform cylindrical shape. The cold pressing method may be of the uniaxial or isostatic types. The preferred method for arriving at the hollow cylindrical shape shown in FIG. 1 is through an extrusion method, whereby an extrusion mixture is prepared by adding an appropriate binder system to the prepared hexaferrite power. This mixture is extruded through an appropriate die to give a hollow cylindrical cross-section. The extruded preform is dried for a predetermined time, at predetermined temperature and humidity levels to impart sufficient green strength to allow handling of the formed structure.

A soft (deformable) steel cylindrical container 20, having an open end 24, a predetermined wall thickness $t_2$ and an inner diameter dimension $d_3$ which is slightly larger than that of the dried ceramic preform, is provided at a sufficient length so as to be able to contain the ceramic preform. The ceramic preform is inserted into the open end 24 of the steel container 20.

A solid cylindrical mandrel 30 is provided, having a diameter which is only slightly less than the inner diameter $d_1$ of the ceramic preform. The mandrel 30 is formed of a material having a positive coefficient of thermal expansion that is greater than that of the ceramic material that is to be formed in the HIP process. Parting agents such as NiO, $Al_2O_3$, $ZrO_2$ or BN may be used between the mandrel and the inner surface of the preform 10 to prevent chemical bonding between those elements during the HIP process. The mandrel 30 is inserted into the hollow portion 12 of the ceramic preform 10 within the steel container 20.

Subsequent to making the mandrel/preform/container assembly, the ends of the container 20 are hermetically sealed, a vacuum connection is made and the can is evacuated for a period of time to remove all volatile material including the binders.

The hermetically sealed cans are then subjected to a HIP procedure whereby the cans are loaded into a HIP pressure vessel. The temperature within the vessel is raised to a level within the range of approximately 1600°–1800° F. while inert gas pressure within the vessel is increased to a level within the range of approximately 10,000–15,000 psi.

The effects of the high pressure inert gases applied to the cans at the proper temperature causes uniform pressures on exterior surfaces to compress the contained preform uniformly against the slightly expanding mandrel 30 and achieve densities approaching a theoretical maximum. Such a high degree of densification is believed to be caused by the fact that the normally randomly oriented hexaferrite flake/shaped platelet crystals align themselves through movement and controlled crystal growth to a preferred orientation such that their "C" axes are oriented parallel to the direction of the applied gas pressure forces. Crystal growth within the hexaferrite material takes place during the HIP application and is controlled by appropriate selection of time, temperature and pressure. After the desired amount of the HIP procedure is completed, the pressure is reduced to atmospheric and the temperature is reduced. Upon cooling, the mandrel tends to contract to its normal size and is readily removable from the densified ceramic magnet material.

The resultant assembly is a steel outer shell that is slightly reduced in its outer diameter and has an increased thickness $t_2'$ due to the HIP deformation and metal flow. The resulting inner liner coating of the densified ceramic magnet material is in a crystalline form with oriented crystals and has a reduced thickness $t_1'$. The inner diameter of the densified ceramic magnet is approximately the same as the original preform due to the fact that the mandrel expanded and prevented the inner diameter from shrinking. A cross-section of the finished product is shown in FIG. 5.

In order to prepare the assembly for use as an electric motor yoke, it is cut into desired lengths that are equal to the yoke length of a particular motor design. Subsequently, the inner diameter of the magnetic material is precisely ground to an even and precise tolerance, if necessary. The magnets are then charged with an electromagnetic field to provide the necessary number of poles for the particular motor design.

The resultant assembly provides the motor yoke having an in-situ formed permanent magnet of a 360° configuration as an integral unit.

In the alternative, the outer metal shell can be stripped from the magnet so that it may then be placed in a preformed yoke of a desired length.

Samples formed under the process described herein utilized the following procedure:

1. A fine grained hexaferrite material of $S_rO.6Fe_2O_3$ was selected in which the molar ratio was within the range of 1:5 to 1:6.5 and in which individual platelets are less than two (2) microns.
2. The hexaferrite material was mixed with an appropriate binder system.
3. The mixture was die pressed into a hollow cylindrically shaped green preform at approximately 95,000 psi to a density of approximately 60 percent of theoretical maximum (3.12 gms/cm$^3$) for two samples and at approximately 20,000 psi to a density of 49 percent of theoretical maximum (2.57 gms/cm$^3$) for two other samples.
4. The samples were encapsulated in soft metal containers of a ferromagnetic and steel.
5. A solid mandrel was inserted into the core of each sample.
6. The volatile binder materials and moisture were outgassed at 500° F. for 14 hours.
7. The containers were hermetically sealed.
8. The HIP process was applied to the sealed containers at 1700° F. for five minutes at 15,000 psi.

Subsequent to processing the samples, the housing was removed from the samples, so that density testing could be performed. It was found that the two samples preformed at lower green densities were 98 percent of theoretical maximum and the two samples preformed at the higher green densities were 99 percent of theoretical maximum.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A method of forming multipoled ring magnets comprising the steps of:
    preparing a predetermined mixture of a ceramic hexaferrite platelet material;
    forming said mixture into a predetermined hollow cylindrical shape;
    providing a cylindrical metal housing of predetermined dimensions wherein the inside diameter is slightly larger than the outside diameter of said cylindrically formed mixture;
    placing said cylindrically formed mixture into said housing;
    providing a cylindrical mandrel having a predetermined outer diameter that is slightly less than that of the index diameter of said cylindrical mixture;
    evacuating volatile gases from said housing;
    hermetically sealing said housing containing said ceramic material mixture and said mandrel;
    applying inert gas at predetermined pressure and temperature to said sealed housing for a predetermined period of time to effect densification and platelet alignment of said ceramic material mixture;
    allowing said sealed housing to cool;
    removing said mandrel;
    cutting said housing, bearing the densified ceramic magnetic material, into predetermined lengths and magnetically charging the densified ceramic magnetic material to form multipoled ring magnets.
2. A method as in claim 1, wherein said hexaferrite platelet material is selected from the group consisting of strontium, barium, and lead.
3. A method as in claim 2, wherein said hexaferrite material is a powder having grain sizes of less than 2 microns.
4. A method as in claim 2, wherein said temperature is applied within a range of from 1,600°–1,800° F. at a pressure in a range of 10,000–15,000 psi.
5. A method as in claim 2, further including a step of removing said housing from said densified ceramic material.
6. A method as in claim 1, wherein said step of applying pressure and heat to said sealed housing compressibly deforms said housing to conform to the densified shape of said ceramic magnetic material.

7. A method of integrally forming a 360° cylindrical permanent motor magnet within a yoke comprising the steps of:

forming a predetermined proportionate mixture of ceramic hexaferrite platelet magnet material into a hollow cylindrical shape having predetermined outer and inner diameter dimensions;

providing a deformable hollow cylindrical metal container having an inner diameter that is only slightly larger than the outer diameter of said formed ceramic material mixture;

providing a solid mandrel with a diameter that is only slightly smaller than the inner diameter of said formed ceramic material mixture;

inserting said formed ceramic material mixture into said cylindrical container and said mandrel into said formed ceramic material mixture;

hermetically sealing said container;

isostatically applying heat and pressure to said sealed container at predetermined levels for a predetermined period of time to effect densification of said ceramic magnet material;

cooling said sealed container;

removing said mandrel from said densified ceramic magnetic material; and electromagnetically charging said densified ceramic material, after removal of said mandrel to define a plurality of poles to thereby provide a multipoled 360° cylindrical permanent magnet;

wherein said sealed container is compressibly deformed against said densified ceramic magnetic material by said isostatic step and said 360° cylindrical magnet is integrally formed and held by compression in said deformed cylindrical container suitable for use as a yoke in a motor configuration.

8. A method as in claim 7, wherein said cooled magnet material within said container is cut to predetermined lengths whereby each piece is suitable for use as a one piece yoke and motor magnet assembly.

* * * * *